United States Patent [19]
Engle

[11] Patent Number: 6,001,040
[45] Date of Patent: Dec. 14, 1999

[54] HYDRAULICALLY OPERATED LIMITED SLIP DIFFERENTIAL

[75] Inventor: James L. Engle, Auburn, Ind.

[73] Assignee: Auburn Gear, Inc., Auburn, Ind.

[21] Appl. No.: 09/030,168

[22] Filed: Feb. 25, 1998

[51] Int. Cl.$^6$ ................................................. F16H 48/22
[52] U.S. Cl. .............................. 475/88; 475/86; 475/231; 475/240
[58] Field of Search ................................ 475/86, 88, 223, 475/224, 231, 234, 235, 236, 240

[56] References Cited

U.S. PATENT DOCUMENTS

| | | |
|---|---|---|
| Re. 33,742 | 11/1991 | Blessing et al. ................... 475/150 |
| 1,487,073 | 3/1924 | Nogrady ........................ 475/234 X |
| 2,004,929 | 6/1935 | Centervall ........................ 180/9.2 |
| 2,026,777 | 1/1936 | Dumble . |
| 2,775,141 | 12/1956 | Ronning . |
| 2,855,805 | 10/1958 | Fallon ............................. 475/234 |
| 2,913,928 | 11/1959 | Double . |
| 2,922,319 | 1/1960 | Burner . |
| 2,949,792 | 8/1960 | Smith . |
| 3,027,781 | 4/1962 | O'Brien . |
| 3,229,550 | 1/1966 | Nickell . |
| 3,230,795 | 1/1966 | Mueller . |
| 3,251,244 | 5/1966 | Nickell . |
| 3,350,961 | 11/1967 | Dodge . |
| 3,361,008 | 1/1968 | Fallon . |
| 3,364,791 | 1/1968 | Truckle . |
| 3,365,983 | 1/1968 | Jeakle . |
| 3,390,593 | 7/1968 | Brownyer ......................... 475/240 |
| 3,393,582 | 7/1968 | Mueller . |
| 3,402,799 | 9/1968 | Tharpe ............................ 192/107 |
| 3,407,599 | 10/1968 | Ulbricht ............................ 60/54 |
| 3,457,807 | 7/1969 | Altmann . |
| 3,490,312 | 1/1970 | Seitz et al. . |
| 3,546,969 | 12/1970 | Gibson et al. . |
| 3,628,399 | 12/1971 | Seitz et al. . |
| 3,686,976 | 8/1972 | Philippi . |
| 3,724,289 | 4/1973 | Kennicutt . |
| 3,742,784 | 7/1973 | Engle . |
| 3,748,928 | 7/1973 | Shiber . |
| 3,752,280 | 8/1973 | Cheek ............................. 192/85 AA |
| 3,815,443 | 6/1974 | McAninch et al. .................. 475/235 |

(List continued on next page.)

OTHER PUBLICATIONS

"VISCO–LOK: A Speed Sensing Limited–Slip Device with High–Torque Progressive Engagement", SAE Technical Paper Series, No. 960718, Feb. 1996.
"Tech & Trends Gerodisc Slashes Cost, Weight in All–Wheel Drive", Aug. 1992.
"Disco–Tech", Automotive Industries, Jun. 1992.
"Development of the Electro–Magnetic Controlled Limited Slip Differential Unit (EMCD)", Tochigi Fuji Sangyo K.K. before Sep. 1997.

*Primary Examiner*—Sherry L. Estremsky
*Attorney, Agent, or Firm*—Baker & Daniels

[57] ABSTRACT

A hydraulically actuated limited slip differential which can be configured to be either speed and torque sensitive or speed sensitive. The differential includes a hydraulic pump mechanism comprising a plurality of fluid supply passages disposed in a side gear and in fluid communication with a cavity defined by the side gear and a piston. The hydraulic pump mechanism transfers fluid into the cavity in response to meshing rotation between the pinion gears and the side gears. Sufficiently high differentiation between the output shafts increases the pressure in the cavity to increase frictional pressure between a frictional clutch mechanism and the differential casing to provide braking action between the side gears and the differential casing. The angular relationship between the clutch surfaces of the clutch mechanism and the differential casing may be configured such that the side gear separating forces and hydraulic pressure act in either a reinforcing or opposing manner. The side gear may be indirectly engaged with the differential casing to provide a speed and torque sensitive differential or directly contact the differential casing to provide a speed sensitive differential.

23 Claims, 3 Drawing Sheets

U.S. PATENT DOCUMENTS

| | | |
|---|---|---|
| 3,835,730 | 9/1974 | Pemberton ................... 74/650 |
| 3,894,446 | 7/1975 | Snoy et al. . |
| 3,923,113 | 12/1975 | Pagdin ................... 180/44 R |
| 3,987,689 | 10/1976 | Engle . |
| 4,012,968 | 3/1977 | Kelbel . |
| 4,041,804 | 8/1977 | Clark . |
| 4,059,026 | 11/1977 | Stritzel ................... 475/88 |
| 4,258,588 | 3/1981 | Yum . |
| 4,263,824 | 4/1981 | Mueller . |
| 4,269,086 | 5/1981 | Altmann . |
| 4,272,993 | 6/1981 | Kopich . |
| 4,389,909 | 6/1983 | Goscenski, Jr. . |
| 4,445,400 | 5/1984 | Sullivan et al. . |
| 4,467,886 | 8/1984 | DeClaire et al. ................... 180/197 |
| 4,493,387 | 1/1985 | Lake et al. ................... 180/248 |
| 4,548,096 | 10/1985 | Giocastro et al. ................... 74/650 |
| 4,601,359 | 7/1986 | Weismann et al. ................... 180/233 |
| 4,606,428 | 8/1986 | Giere ................... 180/307 |
| 4,612,825 | 9/1986 | Engle . |
| 4,630,505 | 12/1986 | Williamson . |
| 4,644,822 | 2/1987 | Batchelor . |
| 4,650,028 | 3/1987 | Eastman et al. ................... 80/233 |
| 4,671,373 | 6/1987 | Sigl ................... 180/197 |
| 4,679,463 | 7/1987 | Ozaki et al. . |
| 4,714,129 | 12/1987 | Mueller ................... 180/248 |
| 4,719,998 | 1/1988 | Hiramatsu et al. ................... 192/0.033 |
| 4,727,966 | 3/1988 | Hiramatsu et al. ................... 192/0.033 |
| 4,730,514 | 3/1988 | Shikata et al. . |
| 4,732,052 | 3/1988 | Dewald . |
| 4,776,234 | 10/1988 | Shea ................... 74/710.5 |
| 4,781,078 | 11/1988 | Blessing et al. . |
| 4,821,604 | 4/1989 | Asano ................... 74/718 |
| 4,867,012 | 9/1989 | McGarraugh . |
| 4,869,129 | 9/1989 | Hazebrook . |
| 4,876,921 | 10/1989 | Yasui et al. . |
| 4,884,470 | 12/1989 | Onoue . |
| 4,905,808 | 3/1990 | Tomita et al. ................... 192/85 AA |
| 4,909,371 | 3/1990 | Okamoto et al. ................... 192/103 F |
| 4,919,006 | 4/1990 | Willett et al. ................... 74/650 |
| 4,943,269 | 7/1990 | Smith ................... 475/231 |
| 4,957,473 | 9/1990 | Takemura et al. ................... 475/231 |
| 4,960,011 | 10/1990 | Asano ................... 74/650 |
| 4,966,268 | 10/1990 | Asano et al. ................... 192/58 |
| 4,974,471 | 12/1990 | McGarraugh . |
| 4,989,686 | 2/1991 | Miller et al. ................... 180/197 |
| 5,005,131 | 4/1991 | Imaseki et al. ................... 364/426.02 |
| 5,019,021 | 5/1991 | Janson ................... 475/150 |
| 5,021,038 | 6/1991 | Beigang ................... 475/85 |
| 5,024,634 | 6/1991 | Blessing ................... 475/86 |
| 5,030,181 | 7/1991 | Keller ................... 475/150 |
| 5,037,362 | 8/1991 | Teraoka et al. ................... 475/235 |
| 5,041,069 | 8/1991 | Horst ................... 475/231 |
| 5,045,038 | 9/1991 | Sherlock ................... 475/235 |
| 5,055,096 | 10/1991 | Riemscheid et al. ................... 475/249 |
| 5,059,160 | 10/1991 | Raniero ................... 475/234 |
| 5,080,640 | 1/1992 | Botterill ................... 475/231 |
| 5,087,228 | 2/1992 | Johansson ................... 475/88 |
| 5,092,825 | 3/1992 | Goscenski, Jr. et al. ................... 475/150 |
| 5,106,349 | 4/1992 | Botterill et al. ................... 475/150 |
| 5,156,578 | 10/1992 | Hirota ................... 475/150 |
| 5,189,930 | 3/1993 | Kameda ................... 74/650 |
| 5,217,416 | 6/1993 | Dick ................... 475/150 |
| 5,226,861 | 7/1993 | Engle ................... 475/234 |
| 5,269,730 | 12/1993 | Hirota ................... 475/150 |
| 5,275,254 | 1/1994 | Shiraishi et al. ................... 180/248 |
| 5,289,895 | 3/1994 | Takata et al. ................... 180/248 |
| 5,310,388 | 5/1994 | Okcuoglu et al. ................... 475/88 |
| 5,322,484 | 6/1994 | Reuter ................... 475/150 |
| 5,326,333 | 7/1994 | Niizawa et al. ................... 475/249 |
| 5,333,512 | 8/1994 | Pruss et al. ................... 74/331 |
| 5,373,912 | 12/1994 | Haiki et al. ................... 180/249 |
| 5,396,421 | 3/1995 | Niikura et al. ................... 364/424.1 |
| 5,464,084 | 11/1995 | Aoki et al. ................... 192/35 |
| 5,479,348 | 12/1995 | Sasaki ................... 364/426.03 |
| 5,503,602 | 4/1996 | Dick ................... 475/204 |
| 5,507,703 | 4/1996 | Madsack et al. ................... 472/248 |
| 5,536,215 | 7/1996 | Shaffer et al. ................... 475/88 |
| 5,556,344 | 9/1996 | Fox ................... 475/235 |
| 5,556,350 | 9/1996 | Madsack ................... 475/85 |
| 5,637,050 | 6/1997 | Chludek ................... 475/249 |
| 5,655,983 | 8/1997 | Dick ................... 475/88 |
| 5,658,214 | 8/1997 | Hofstetter et al. ................... 475/249 |
| 5,699,888 | 12/1997 | Showalter ................... 192/35 |
| 5,741,199 | 4/1998 | Tanser et al. ................... 475/235- |

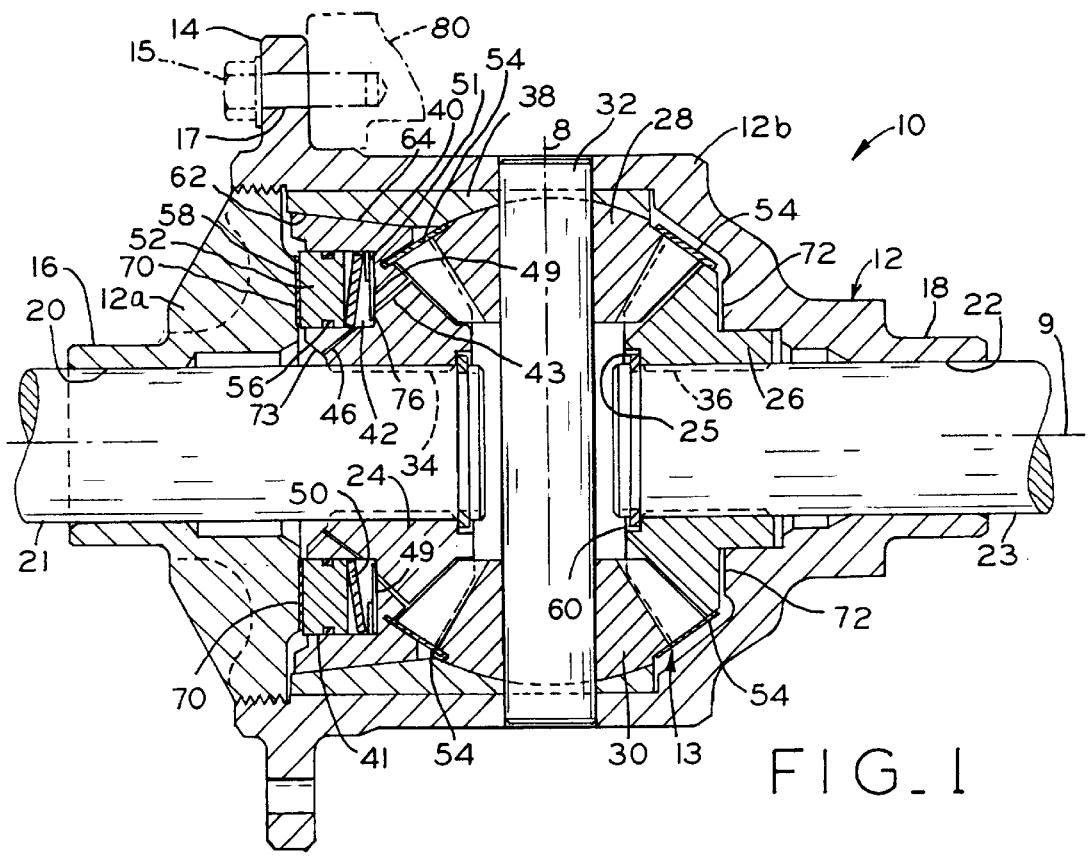
FIG_1
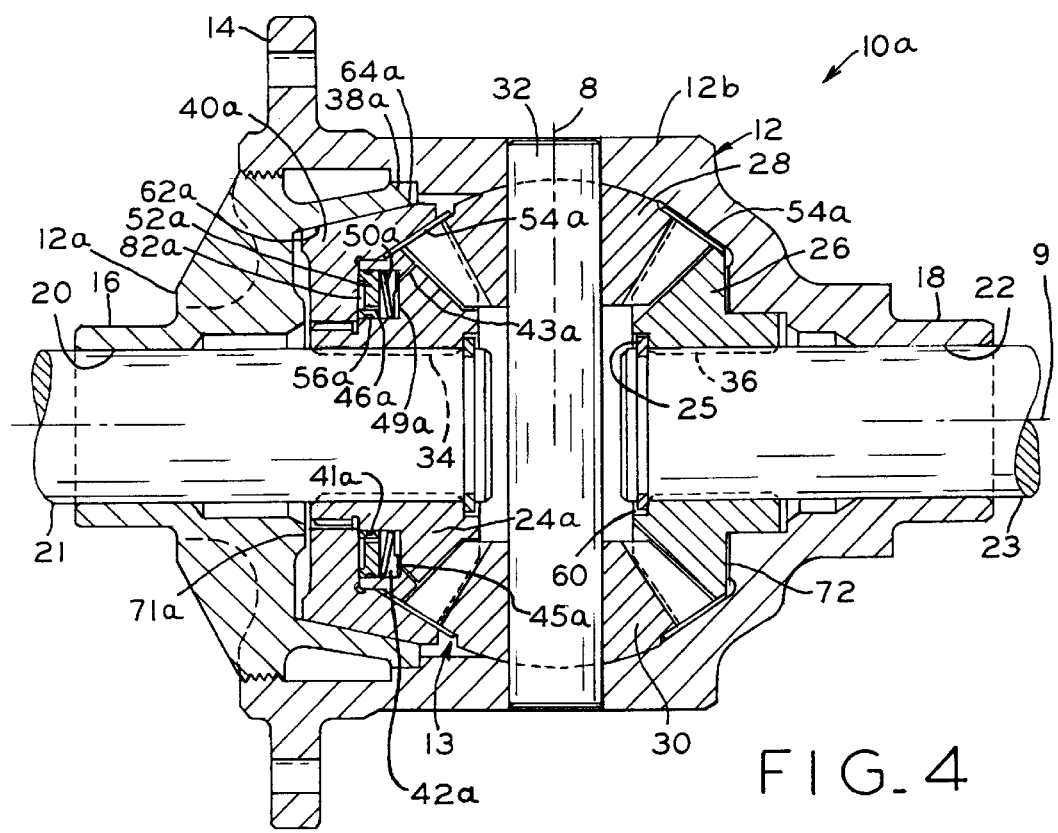
FIG_4

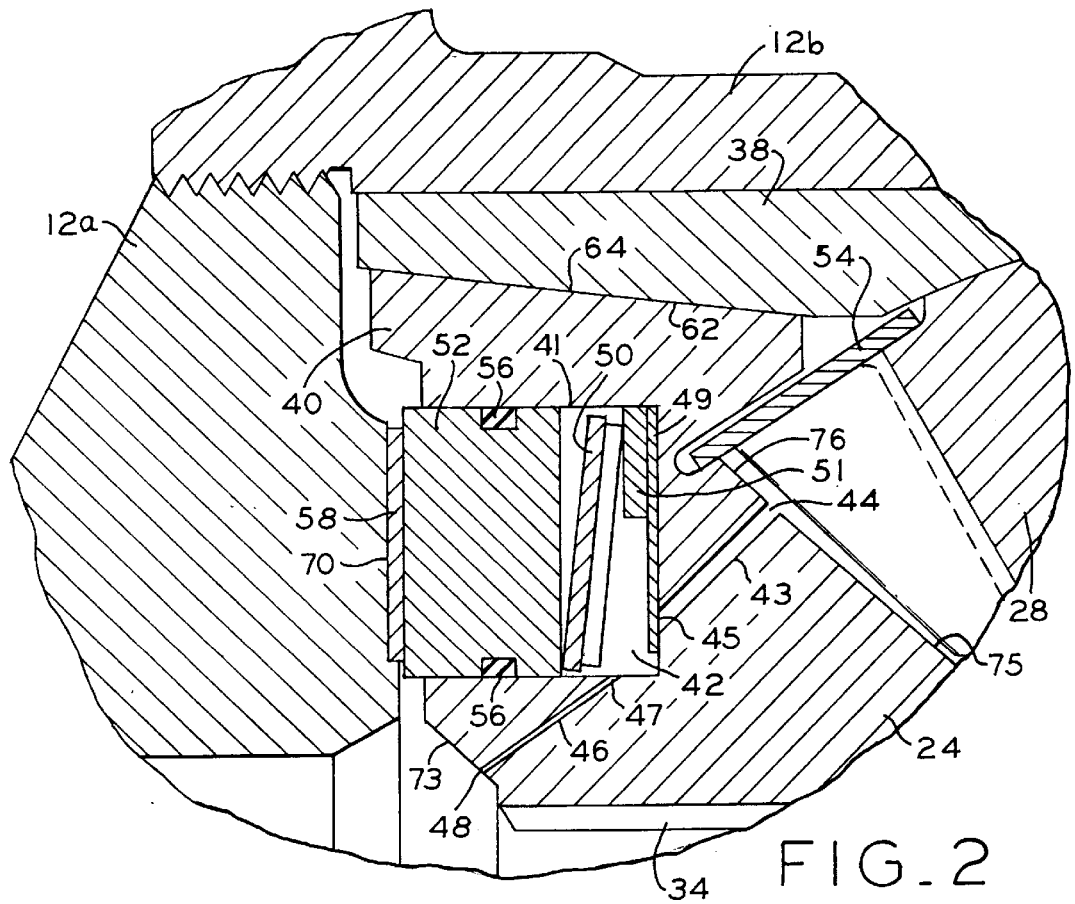
FIG_2
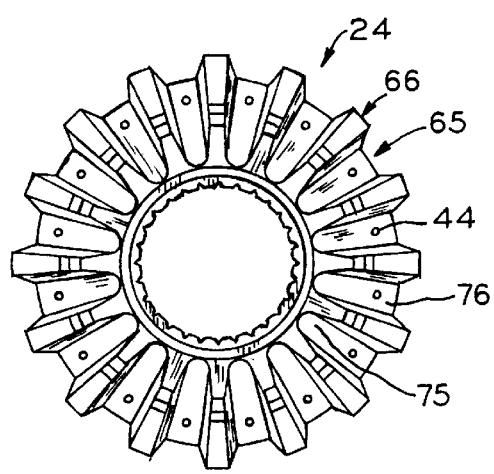
FIG_3

HYDRAULICALLY OPERATED LIMITED SLIP DIFFERENTIAL

BACKGROUND OF THE INVENTION

1. Field of the Invention

The present invention relates to differentials, and more particularly, to limited slip differentials.

2. Description of the Related Art

Differentials are well known in the prior art and allow a pair of output shafts operatively coupled to an input shaft to rotate at different speeds, thereby allowing the wheel associated with each output shaft to maintain traction with the road while the vehicle is turning. Such a device essentially distributes the torque provided by the input shaft between the output shafts. However, the necessity for a differential which limits the differential rotation between the output shafts to provide traction on slippery surfaces is well known.

The completely open differential, i.e. a differential without clutches or springs, is unsuitable in slippery conditions where one wheel experiences a much lower coefficient of friction than the other wheel, for instance, when one wheel of a vehicle is located on a patch of ice and the other wheel is on dry pavement. In such a condition, the wheel experiencing the lower coefficient of friction loses traction and a small amount of torque to that wheel will cause a "spin out" of that wheel. Since the maximum amount of torque which can be developed on the wheel with traction is equal to torque on the wheel without traction, i.e. the slipping wheel, the engine is unable to develop any torque and the wheel with traction is unable to rotate. A number of methods have been developed to limit wheel slippage under such conditions.

Prior methods of limiting slippage between the side gears and the differential casing use a frictional clutch mechanism, either clutch plates or a frusto-conical structure, and a bias mechanism, usually a spring, to apply an initial preload between the frictional clutch mechanism and the differential casing. By using a frictional clutch mechanism with an initial preload, for example a spring, a minimum amount of torque can always be applied to the wheel having traction, i.e. the wheel located on dry pavement. The initial torque generates gear separating forces which further engage the frictional clutch and develop additional torque. Examples of such limited slip differentials are disclosed in U.S. Pat. Nos. 4,612,825 (Engle), 5,226,861 (Engle) and 5,556,344 (Fox), which are assigned to the assignee of the present invention and expressly incorporated herein by reference.

The initial preload initiates the development of side gear separating forces which provide further braking action between the side gears and the differential casing. In general, gear separating forces are forces induced on any set of meshing gears by the application of torque to the gears and which forces tend to separate the gears. In a differential, the development of torque will create side gear separating forces which tend to move the side gears away from the pinion gears. On a surface having a low coefficient of friction, the initial preload creates contact and friction pressure between the differential casing and the clutch mechanism disposed between the side gears and the differential casing to allow the engine to develop an initial torque. This initiation of torque transfer induces gear separating forces on the side gears which tend to separate the side gears to further increase friction between the clutch mechanism and the casing. The increased friction pressure of the clutch allows more torque to be developed, thus further increasing the side gear separating forces and limiting the slippage between the side gears and the differential casing.

However, such preloaded clutches are usually always engaged, and thus are susceptible to wear, causing undesirable repair and replacement costs. Additionally, such clutch mechanisms usually employ spring mechanisms which add to the cost and difficulty of manufacture.

Additionally, such a preloaded clutch mechanism may lock the output shafts together in situations where differential rotation is necessary. For example, if the vehicle is making a turn when the wheels are sufficiently engaged on the road surface and a sufficient amount of torque is developed, the differential will tend to lock up the output shafts due to the action of the side gear separating forces created by the developed torque. This may occur, for example, during tight turns on surfaces with a low coefficient of friction. In such a case, even though differential rotation is required, the torque and side gear separating forces lock up the two output shafts causing either wheel to drag and slide along the road surface. This problem is evident in rear drive vehicles during tight turns as the portion of the vehicle near the dragging wheel may tend to bounce up and down.

Another method of limiting slippage involves the use of a frictional clutch between the side gears and the differential casing based on the difference in rotational speeds between the two output shafts. The frictional clutch may be actuated by various hydraulic pump mechanisms which may be external to the differential case or may be constructed of elements disposed inside the differential casing. However, such mechanisms usually are complicated and also add to the cost and difficulty of manufacture.

Thus, what is needed is a simple, durable and reliable limited slip differential which can effectively provide torque to the wheel with traction.

What is also needed is a limited slip differential which is responsive to both the torque and speed difference to provide the limited slip function only when required, i.e. limited slip when one wheel has lost traction and relatively open when sufficient torque is developed.

SUMMARY OF THE INVENTION

The limited slip differential according to the present invention comprises a hydraulically actuated clutch element and a fluid pump assembly disposed inside a differential casing. The clutch element is disposed between the side gear and the differential casing and includes a frusto-conical clutch surface which frictionally contacts an inner surface of the differential casing. The torque capacity of the frusto-conical surface and the inner surface of the differential casing depends on an initial bias, the cone angle, the mean radius of the cone, the side gear separating forces, the hydraulic pressure output of the fluid pump assembly and combinations thereof. Alternatively, the present invention may be adapted such that the clutch elements include, instead of a frusto-conical clutch surface, one or more frictionally-engaging plates disposed between the side gear and the differential casing to frictionally couple surfaces on the side gear and the interior of the differential casing. The torque capacity of the alternative friction plate surface and frictionally engaged inner surface of the differential casing would depend on an initial bias, the number of plates, the mean radius of the plates, the side gear separating forces, the hydraulic pressure output of the fluid pump assembly and combinations thereof.

The fluid pump assembly according to the present invention is a simple, rugged and durable design. The fluid pump assembly includes a plurality of supply passages disposed in a side gear, each supply passage having an inlet disposed on the root surface of a side gear tooth and an outlet in fluid communication with a cavity formed by the side gear and a piston. With such a configuration, the fluid pump assembly provides fluid pressure to transfer the fluid located within the root volumes of the side gear into the cavity when meshing rotation exists between the roots and teeth of the pinion gears and the side gears. When such meshing rotation exists, a tooth of the pinion gear rotates to mesh with a root of the side gear to displace the volume of fluid held in the root volume to force that volume of fluid into the supply passage. It can be seen that the output of the pump assembly depends on the rate of meshing rotation between the pinion and side gears. Pump assembly output is not dependent, however, on the direction of rotation of the side gears and pinion. The pumping action builds up the fluid pressure in the cavity which in turn increases the frictional pressure between the clutch mechanism and the inner surface of the differential casing to thereby transfer torque to the wheel having traction.

By altering the angular orientation between the frusto-conical clutch surface and the differential casing inner surface, the torque response and the speed response may be designed to act in a reinforcing or an opposing manner.

By changing the configurations of the side gear and the differential casing, the differential may be configured to be either speed and torque sensitive or speed sensitive. In the speed and torque sensitive configuration, the clutch element is responsive to a combination of the torque developed by the engine and the speed difference between the side gears. In the speed sensitive configuration, the clutch element is only responsive to the speed difference between the side gears.

The invention comprises, in one form thereof, a speed and torque sensitive limited slip differential having a frusto-conical clutch surface and an inner surface of a differential casing angled such that the side gear separating force tends to disengage or lessen the frictional pressure between the frusto-conical clutch surface and the inner surface of the differential casing, while the fluid pressure generated in the cavity by the pump assembly tends to increase frictional pressure between the frusto-conical clutch surface and the inner surface of the differential casing.

The invention comprises, in another form thereof, a speed and torque sensitive limited slip differential having a frusto-conical clutch surface and an inner surface of a differential casing angled such that the side gear separating force and the fluid pressure generated in the cavity by the fluid pump assembly both tend to increase frictional pressure between the frusto-conical clutch surface and the inner surface of the differential casing.

The invention comprises, in another form thereof, a speed sensitive limited slip differential having a side gear which directly contacts an inner surface of a differential casing so that the side gear separating force is transmitted directly to the differential casing and does not affect the frictional pressure between the frusto-conical clutch surface and the inner casing of the differential casing.

BRIEF DESCRIPTION OF THE DRAWINGS

The above mentioned and other features and objects of this invention, and the manner of attaining them, will become more apparent and the invention itself will be better understood by reference to the following description of the embodiments of the invention taken in conjunction with the accompanying drawings, wherein:

FIG. 1 is a cross-sectional view of an embodiment of a limited slip differential of the present invention which is speed and torque sensitive;

FIG. 2 is an enlarged, fragmentary view of detail 2 in FIG. 1;

FIG. 3 is a front elevational view of side gear 24 of FIG. 1 showing the supply passage inlet openings;

FIG. 4 is a cross-sectional view of a second embodiment of a limited slip differential of the present invention which is speed and torque sensitive.

Figure 5:
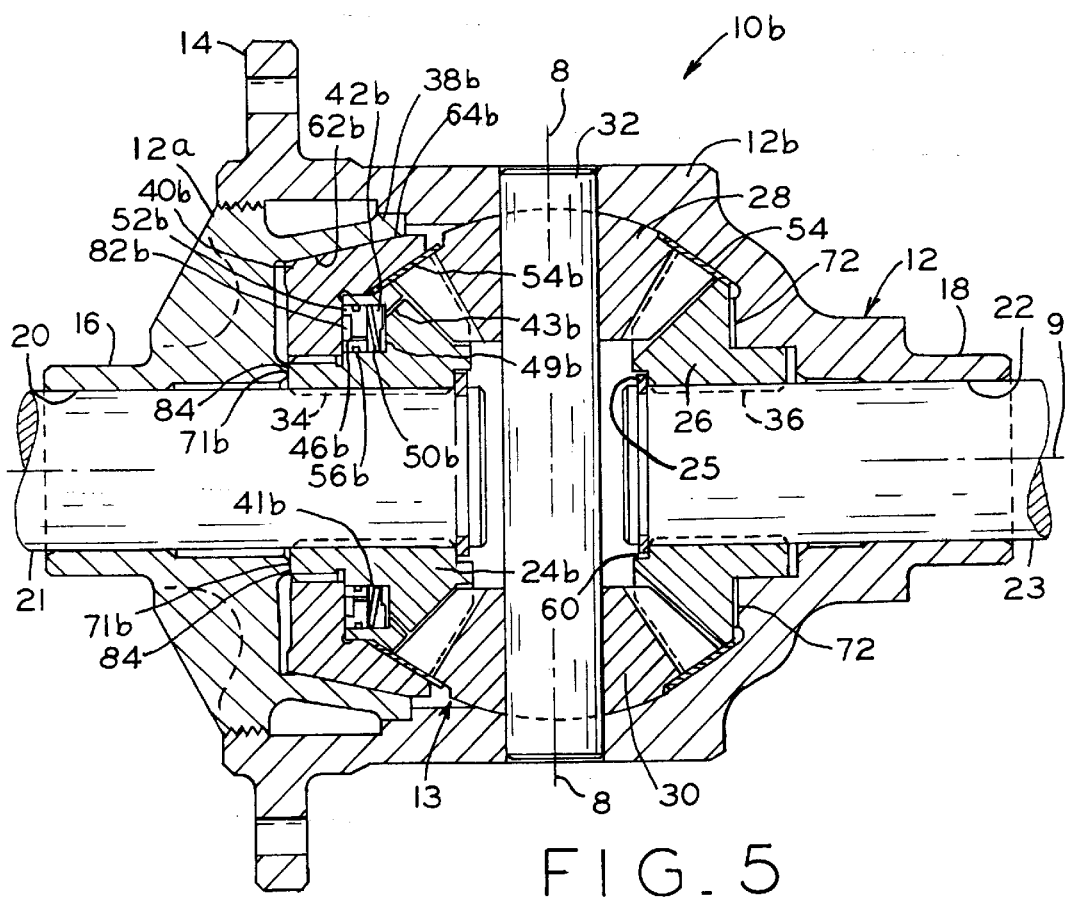
FIG. 5 is a cross-sectional view of a third embodiment of a limited slip differential of the present invention which is speed sensitive.

Corresponding reference characters indicate corresponding parts throughout the several views. Although the drawings represent preferred embodiments of the present invention, the drawings are not necessarily to scale and certain features may be exaggerated in order to better illustrate and explain the present invention. The exemplification set out herein illustrates embodiments of the invention, in several forms, and such exemplifications are not to be construed as limiting the scope of the invention in any manner.

DETAILED DESCRIPTION OF THE INVENTION

The embodiments disclosed below are not intended to be exhaustive or limit the invention to the precise forms disclosed in the following detailed description. Rather, the preferred embodiments are chosen and described so that others skilled in the art may be able to utilize their teachings.

Referring to the drawings, and particularly to FIG. 1, limited slip differential 10 of the present invention comprises differential casing 12 which is constructed by joining casing parts 12a and 12b to form a generally cylindrical structure and defining inner cavity 13. Inner cavity 13 is constructed to hold a differential gear assembly and a suitable, incompressible lubricant, and includes end walls 70, 72 defined by the interior surfaces of casing parts 12a, 12b, respectively. The exterior surface of casing 12 includes flange 14 formed on one side thereof for connecting differential 10 to driving ring gear 80 using conventionally known means, such as threaded fasteners 15. Casing 12 also includes hollow receiving hubs 16, 18 on each end, the hubs defining apertures 20, 22 for accepting output shafts 21, 23.

Disposed within inner cavity 13 are meshingly engaged pinion gears 28, 30 and side gears 24, 26. Pinion gears 28, 30 are disposed at right angles to side gears 24, 26 and are rotatably mounted on cross pin 32. Cross pin 32 is fixedly disposed in the inner cavity of casing 12, generally midway between end walls 70 and 72. Cross pin 32 is locked in position within casing 12 such that pinion gears 28, 30 rotate with casing 12 around axis 9 defined by hubs 16, 18. Pinion gears 28, 30 can also rotate about cross pin 32.

Side gears 24, 26 are axially aligned and rotatably disposed within differential casing 12 to rotate about horizontal axis 9. Side gears 24, 26 include internal splines 34, 36 which engage corresponding splines of output shafts 21, 23. The roots and teeth of side gears 24, 26 meshingly engage the roots and teeth of pinion gears of 28, 30 such that differential rotation can be effected between casing 12 and output shafts 21, 23. Side gears 24, 26 each have, in their inward axial faces, annular step 60 in which "c" washer 25, seated in a mating annular groove provided in the surface of each shaft 21, 23, is disposed. "C" washer 25 prevents outwardly directed axial withdrawal of each shaft 21, 23 from its respective side gear 24, 26 by abutting an adjacent axial surface of the side gear. Shafts 21, 23 may slide inwardly towards one another through their respective side gears 24, 26 along splines 34, 36 to the extent that the end of each shaft abuts the outer surface of cross pin 32.

As shown in FIGS. 1 and 2, side gear 24 includes frusto-conical clutch element 40 connected around the periphery of side gear 24. Clutch element 40 includes clutch surface 62 which frictionally contacts surface 64 of insert 38. The friction between clutch surface 62 insert surface 64 limits the differential rotation between side gear 24 and differential casing 12. It is to be understood that although clutch element 40 is shown to be integrally formed around side gear 24 in FIG. 1, clutch element 40 may be formed as a separate component and inserted between side gear 24 and insert 38. It is also to be understood that insert 38 may be formed integrally within casing part 12b. If insert 38 is a separate part, insert 38 must be secured to differential casing part 12b, for example, by positioning cross pin 32 through casing part 12b and insert 38.

Side gear 24 also includes recessed portion 41 formed at the base portion thereof. Piston 52 is disposed in recessed portion 41 and engages the inside face of endwall 70 via thrustwasher 58. The combination of recessed portion 41 and piston 52 form cavity 42. Seals 56 disposed around piston 52 prevent fluid leakage from cavity 42 between piston 52 and side gear 24. As will be described further below, the build-up of fluid pressure in cavity 42 applies pressure to increase friction between clutch member 40 and insert 38. Since piston 52 is engaged with thrustwasher 58 which rests against the inside face of endwall 70, any build-up of pressure in cavity 42 tends to push side gear 24 away from the inside face of endwall 70, thereby pushing clutch surface 62 of clutch member 40 into further frictional contact with surface 64 of insert 38.

Belleville spring 50 is disposed inside cavity 42 and provides an initial spring bias to force clutch member 40 to frictionally contact insert 38. Again, since piston 52 rests against the inside face of endwall 70 via thrustwasher 58, Belleville spring 50 tends to push side gear 24 away from inside face of endwall 70. The initial spring bias on side gear 24 forces clutch surface 62 of clutch element 40 to frictionally contact surface 64 of insert 38 to provide an initial preload. The initial preload serves as a brake to prevent unwanted rotation between side gears 24, 26 and differential casing 12. The spring characteristics and the angle of clutch surface 62 and insert surface 64, which is about 70 in this case, can be tailored to create the desired initial bias characteristic. The 70 surface angle is exemplary and should not be construed as limiting the scope of the present invention. The surface angle may be revised to modify performance characteristics of the clutch.

Further, cavity 42 is in fluid communication with fluid supply passages 43 which are formed on side gear 24 and form a part of a gear pump assembly with side gear 24 and pinion gears 28, 30. Cavity 42 is also in fluid communication with bleed-off passages 46, which may be formed, as shown, in side gear 24, but which may be otherwise provided so as to allow fluid to exit from cavity 42. For example, bleed-off passages 46 may be provided in pistons 52. Fluid supply passages 43 provide a fluid source path to increase the fluid pressure in cavity 42, and bleed-off passages 46 provide a bleed-off path for relieving fluid pressure from cavity 42. It can be seen that a relatively slow introduction of fluid into cavity 42 will not result in fluid pressure build-up in cavity 42 since sufficient fluid will be discharged through bleed-off passage 46, but that a rapid introduction of fluid into cavity 42 exceeding the rate of bleed-off through passage 46 will result in fluid pressure build-up in cavity 42. Thus, normal cornering will not be affected by the present differential design as the gear meshing frequency would not be sufficient to create excessive pressure in cavity 42.

Fluid supply passages 43 may be sized to permit a larger fluid flow rate than bleed-off passages 46 to allow relatively rapid build-up of fluid pressure in cavity 42, but a slower reduction in fluid pressure. Reed valve 49 is disposed in cavity 42 adjacent washer 51 and supply passage outlets 45 to ensure one way flow through supply passages 43. The fluid pump assembly for supplying fluid flow through supply passages 43 is further described below.

As shown in FIGS. 1–3, differential 10 includes a fluid pump assembly formed by the combination of side gear 24, pinion gears 28, 30 and fluid supply passages 43 disposed in side gear 24. In particular, as shown in FIGS. 2–3, side gear 24 includes a plurality of supply passages 43, each supply passage 43 including an inlet opening 44 disposed on the surface of each respective root 65 of side gear 24 and an outlet opening 45 disposed on a surface of cavity 42. Although in FIG. 3, each surface of root 65 includes an inlet opening 44, it is to be understood that the number of inlet openings 44 as well as the ratio of inlet openings 44 to roots 65 may be adjusted as desired. It is also to be understood that the size of inlet openings 44 and outlet openings 45 may be adjusted as desired to provide the required fluid flow rates.

The fluid pump assembly provides pressure to transfer fluid trapped in the root volumes of side gear 24 into cavity 42 based on the meshing rotation between side gear 24 and pinion gears 28, 30. As side gear 24 and pinion gears 28, 30 rotate with respect to each other, about axes 9 and 8, respectively, the roots and teeth of the respective gears meshingly engage and disengage with each other. As a root 65 of side gear 24 comes into engagement with a tooth of pinion gears 28 or 30, the pinion gear tooth displaces the volume of fluid trapped in root 65 and forces the fluid into supply passage inlet 44 disposed in the root surface. The roots and teeth of side gear 24 and pinion gears 28, 30 are angled to mesh closer at face portion 75 than at base portion 76 in order to facilitate and direct the movement of the fluid into supply passage inlets 44 which are disposed near the base portion 76. Sealing washer 54, which may be frustoconical, reduces the loss of fluid through the heel area of side gear 24.

It can be seen that the fluid pump assembly output is speed sensitive since the pump output, and thus the rate of fluid introduction into cavity 42 through supply passages 43, depends on the rate of meshing rotation between side gear 24 and pinion gears 28, 30, i.e., as the speed of meshing rotation increases the amount of fluid transferred through supply passages 43 increases. Therefore, a high rate of rotation between side gear 24 and pinion gear 28, 30, which indicates high differentiation between output shafts 21, 23 and a possible "spin out" condition, results in rapid rate of fluid introduction into cavity 42 which increases fluid pressure in cavity 42 to provide a braking effect between side gear 24 and differential casing 12.

Although only side gear 24 is shown to have an associated cavity 42, fluid pump assembly and clutch element 40 in FIG. 1, it is to be understood that a similar cavity, fluid pump assembly and clutch element may be included with side gear 26, which would then operate similarly to side gear 24.

The operation of the limited slip differential illustrated in FIGS. 1–3 and described above is now explained. Initially, in the resting condition, wherein the components of differential 10 have been interconnected and assembled as described above, differential 10 is connected to output shafts 21, 23, which are respectively coupled to stationary wheels that are in contact with a ground surface, no force is applied to differential 10 by the vehicle engine through driving ring gear 80, and differential casing 12 is stationary. In such a resting condition, Belleville spring 50 provides the initial preload to force piston 52 to contact thrustwasher 58, and clutch element 40 to contact insert 38. An associated engine provides torque to the attached wheels in the conventional manner, namely, through ring gear 80, differential casing 12, cross pin 32, pinion gears 28, 30, side gears 24, 26, splines 34, 36, output shafts 21, 23, to wheels (not shown) attached to the output shafts.

In the case where both wheels have traction and the engine is able to develop torque, the initial preload between clutching surfaces 62 and 64 provided by Belleville spring 50 is reduced by the action of the side gear separating forces. As input torque is applied to casing 12 through a driving pinion and driving ring gear 80, gear separating forces act on side gears 24, 26 and pinion gears 28, 30. The gear separating forces tend to move side gears 24, 26 axially along output shafts 21, 23 away from pinion gears 28, 30. Thus, the gear separating force on side gear 24 tends to move in a direction to compress Belleville spring 50 towards piston 52, thereby reducing the initial clutch preload. As the gear separating forces on side gear 24 compresses Belleville spring 50, the frictional pressure between clutch surface 62 of clutch element 40 and surface 64 of insert 38 is reduced. Thus, the limited slip feature of differential 10 is reduced and the bias between the output shafts and differential casing 12 is reduced. This is a desirable feature as the limited slip feature is not required when the engine is able to develop torque. The reduction of the limited slip feature in such a case eliminates the lock-up problem described previously, namely the lock-up of output shafts during tight turns in which the engine is able to develop torque.

However, in situations where the vehicle is unable to generate torque, i.e. one wheel is on a surface having a low coefficient of friction, differentiation will occur and the limited slip feature is desired to prevent a spin out. In such a case, the limited slip feature is actuated by the action of the fluid pump assembly whose output depends on the speed of differential rotation between output shafts 21, 23. When differentiation occurs, meshing rotation occurs between the roots and teeth of pinion gears 28, 30 and side gears 24, 26. Due to the rotating, meshing action, as the tooth of a pinion gear engages the root of side gear 24, the volumes of fluid contained in the root volumes of side gear 24 are injected by the teeth of the respective pinion gear into supply passage inlets 44, supply passages 43 and cavity 42. Reed valve 49 prevents the outflow of fluid from cavity 42 into supply passages 43.

As high differential rotation occurs and the volume of fluid forced into cavity 42 is greater than the volume released through bleed-off passage 46, pressure builds up in cavity 42. Since piston 52 rests against the inside face of endwall 70 via thrustwasher 58, this pressure build-up tends to force side gear 24, and thus clutch element 40, to move away from endwall 70 and further increase frictional pressure with insert 38. The resulting frictional pressure associated with clutch surface 62 of clutch element 40 and surface 64 of insert 38 tends to reduce, or prevent, relative rotation in the differential components thereby generating a higher bias which increases torque to the non-slipping wheel.

Thus, it can be seen from the above description that limited slip differential 10 shown in FIG. 1 is responsive to both speed and torque since differential 10 responds to both the torque developed by the engine and the speed of differential rotation between the output shafts. The clutch mechanism reduces the frictional pressure between the side gear and the differential casing when the engine is able to develop torque, indicating traction on both wheels. However, the clutch mechanism increases the frictional pressure when there is differential rotation between the output shafts, indicating a loss of traction on a wheel.

FIG. 4 illustrates a second embodiment of the speed and torque sensitive limited slip differential of the present invention in which the angle of clutch surfaces 62a, 64a are oriented oppositely to clutch surfaces 62, 64 of the first embodiment. The different angle orientation of clutch surfaces 62a, 64a results in the gear separating forces having an opposite effect to that of the first embodiment, namely reinforcing the initial bias provided by Belleville spring 50a and tending to further increase frictional pressure between clutch surface 62a and surface 64a.

As shown in FIG. 4, clutch element 40a has a L-shaped cross-section and is disposed between side gear 24a and frictional clutch surface 64a. Side gear 24a includes a plurality of supply passages 43a which are similar in construction to supply passages 43 of the first embodiment. Again, the meshing action of the roots of side gear 24a and the teeth of pinion gears 28, 30 produce a pumping action which provides fluid pressure to force fluid from the root volumes of side gear 24a into cavity 42a via supply passages 43a.

As in the first embodiment, FIG. 4 shows that reed valve 49a is provided at supply passage outlets 45a to ensure one way flow into cavity 42a and Belleville spring 50a is disposed within cavity 42a to provide an initial bias to piston 52a and clutch element 40a. However, in this embodiment, the initial bias forces piston 52a into surface 82a of clutch element 40a which forces clutch element 40a into surface 64a of casing part 12a. The initial bias also tends to force side gear 24a away from endface 71a. It is to be understood that, as in the first embodiment, a separate insert (not shown) may be included between surface 64a and casing part 12a.

The operation of the second embodiment is now described. As in the first embodiment, the initial bias applied by Belleville spring 50a forces clutch element 40a into surface 64a to provide an initial preload. Again, when torque is developed by the engine, the resulting gear separating forces tend to force side gear 24a to move away from pinion gears 28, 30. In this case, the force on side gear 24a is transmitted through Belleville spring 50a and piston 52a to further increase the frictional pressure between clutch element 40a and surface 64a. Therefore, the gear separating force increases the bias between the output shafts and differential casing 12.

When differentiation occurs between output shafts 21, 23, the fluid pump assembly operates in a similar fashion to that of the first embodiment. The meshing rotation between side gear 24a and pinion gears 28, 30 forces fluid through supply passages 43a into cavity 42a, thereby increasing the pressure inside cavity 42a. The pressure inside cavity 42a is transmitted through piston 52a and into frictional clutch element 40a. This force increases the frictional pressure between clutch surfaces 62a and 64a thereby limiting the differential rotation between output shafts 21, 23.

Thus, it can be seen from the above description that limited slip differential 10a shown in FIG. 4 is also responsive to speed and torque. However, in this embodiment, the hydraulically actuated clutch mechanism and fluid pump assembly increase the frictional clutch pressure between the clutch mechanism and the differential casing when either the engine is able to develop torque or when large differential rotation, indicating a loss of traction on a wheel, exists between the output shafts.

FIG. 5 illustrates a third embodiment of the present invention wherein the limited slip differential is only sensitive to speed difference between the output shafts. In the third embodiment, side gear 24b directly engages endface 71b of casing part 12a. In this embodiment, surface 84 of side gear 24b is in direct contact with endface 71b of casing part 12a, and thus, the gear separating forces are directly transmitted from side gear 24b to casing part 12a. Since the gear separating forces are directly transmitted to casing part 12a, the side gear separating forces do not influence the pressure between clutch element 40b and surface 62b.

The clutch element, fluid cavity, piston and clutch surface arrangement of the third embodiment is similar to that of the second embodiment, shown in FIG. 4. As shown in FIG. 5, clutch element 40b has an L-shaped cross section and is disposed between side gear 24b and clutch surface 62b of casing part 12a. Again, cavity 42b is in fluid communication with supply passages 43b and bleed-off passages 46b. Piston 52b is disposed in cavity 42b and Belleville spring 50b provides an initial bias to force clutch element 40b into clutch surface 62b.

Like the first two embodiments, the third embodiment also includes a fluid pump assembly, formed by side gear 24b, pinion gears 28, 30 and supply passages 43b, which are similar in structure and operation to those described in the first and second embodiments. Again, the fluid pump assembly provides fluid pressure to cavity 42b to force clutch element 40b to increase the frictional pressure against surface 64b based on the relative rotation between side gear 24b and pinion gears 28, 30. As the relative rotation increases, the output of the pump assembly increases, thereby increasing the fluid pressure in cavity 42b, forcing clutch element 40b into tighter contact with clutch surface 62b to thereby increase the frictional pressure. However, as noted above, the gear separating forces, and thus the torque generated, have no effect on clutch element 40b since the force on side gear 24b is transmitted directly to casing 12 via surfaces 71b and 84. Therefore, it can be seen that the third embodiment is responsive to speed difference only since the frictional clutch mechanism is actuated only by differential rotation between the output shafts.

While this invention has been described as having an exemplary design, the present invention may be further modified within the spirit and scope of this disclosure. For example, the recess portion, piston and cavity on the side gear may comprise either an annular recess portion, annular piston and annular cavity as well as a plurality of recess portions, pistons and cavities. As described above, the ratio of supply passages to root surfaces on the side gear may be adjusted as desired.

Therefore, this application is therefore intended to cover any variations, uses, or adaptations of the invention using its general principles. Further, this application is intended to cover such departures from the present disclosure as come within known or customary practice in the art to which this invention pertains.

I claim:

1. A limited slip differential, comprising:
    a rotatable casing;
    a pinion gear rotatably supported in said casing;
    a side gear rotatably supported in said casing and rotatably fixed to an output element, said side gear in meshing engagement with said pinion gear, said side gear having a recessed portion defining a cavity and a clutch member rotatably fixed to said side gear; and
    means for causing said clutch member to exert frictional pressure on said casing;
    a fluid pressure source in fluid communication with said cavity, said fluid pressure source transferring fluid into said cavity to generate fluid pressure in said cavity in response to meshing rotation between said side gear and said pinion gear, a build-up in fluid pressure in said cavity causing an increase in the frictional pressure of said clutch member on said casing.

2. The limited slip differential according to claim 1, including a piston in said cavity, said fluid pressure cooperating with said piston to increase said frictional pressure.

3. The limited slip differential according to claim 1, further comprising an insert disposed between said clutch member and said casing, said clutch member seating against said insert.

4. The limited slip differential according to claim 1, further comprising a biasing means disposed in said cavity, said biasing means applying an initial bias to frictionally seat said clutch member against said casing.

5. The limited slip differential according to claim 4, wherein said biasing means comprises a Belleville spring.

6. The limited slip differential according to claim 4, wherein said clutch member comprises a frusto-conical clutch surface, said frusto-conical clutch surface in frictional contact with a surface of said casing to exert a frictional pressure on said casing surface, said frusto-conical clutch surface and said casing surface configured so that gear separating forces applied to said side gear and said pinion gear reduce said frictional pressure of said frusto-conical clutch surface on said casing surface.

7. The limited slip differential according to claim 4, wherein said clutch member comprises a frusto-conical clutch surface, said frusto-conical clutch surface in frictional contact with a surface of said casing, said frusto-conical clutch surface and said casing surface configured so that gear separating forces applied to said side gear and said pinion gear increase said frictional pressure of said frusto-conical clutch surface on said casing surface.

8. The limited slip differential according to claim 1, wherein said fluid pressure source comprises a supply passage disposed in said side gear, said supply passage having an inlet disposed on a surface of said side gear and an outlet in fluid communication with said cavity, whereby the rotational interaction of said side gear and said pinion gear forces fluid into said supply passage inlet.

9. The limited slip differential according to claim 8, wherein said supply passage comprises a plurality of supply passages disposed radially about an axis of said side gear, each said supply passage having an inlet disposed on a root surface of said side gear and an outlet in fluid communication with said cavity.

10. The limited slip differential according to claim 8, further comprising a check valve disposed in said cavity adjacent said supply passage outlet whereby said check valve only permits one way flow through said supply passage.

11. The limited slip differential according to claim 8, further comprising means for reducing the loss of fluid from between said side gear and said pinion gear.

12. The limited slip differential according to claim 8, further comprising a bleed off passage through which fluid exits said cavity.

13. The limited slip differential according to claim 12, wherein said bleed off passage has an inlet connected to said cavity and an outlet disposed on a second surface of said side gear.

14. A limited slip differential, comprising:

a rotatable casing;

a pinion gear rotatably supported in said casing;

a side gear rotatably supported in said casing and rotatable fixed to an output element, said side gear in meshing engagement with said pinion gear, said side gear having a recessed portion formed in a base portion thereof and a clutch member rotatable fixed to said side gear, said clutch member adapted to exert frictional pressure on said casing;

a closure member disposed in said recessed portion, said recessed portion and said closure member defining a cavity, said closure member in contact with said clutch member; and a fluid pressure source in fluid communication with said cavity, said fluid pressure source transferring fluid into said cavity to generate fluid pressure in said cavity in response to meshing rotation between said side gear and said pinion gear, a build-up in fluid pressure in said cavity causing an increase in said frictional pressure by said clutch member on said casing.

15. The limited slip differential according to claim 14, wherein said closure member comprises a piston.

16. The limited slip differential according to claim 14, further comprising a biasing means disposed in said cavity, said biasing means applying an initial bias for frictionally seating said clutch member against said casing.

17. The limited slip differential according to claim 16, wherein said biasing means comprises a Belleville spring.

18. The limited slip differential according to claim 16, wherein said fluid pressure source comprises a supply passage disposed in said side gear, said supply passage having an inlet disposed on a surface of said side gear and an outlet in fluid communication with said cavity, whereby the rotational interaction of said side gear and said pinion gear forces fluid trapped between said side gear and said pinion gear into said supply passage inlet.

19. The limited slip differential according to claim 18, wherein said supply passage comprises a plurality of supply passages disposed radially about an axis of said side gear, each said supply passage having an inlet disposed on a root surface of said side gear and an outlet in fluid communication with said cavity.

20. The limited slip differential according to claim 18 further comprising a check valve disposed in said cavity adjacent said supply passage outlet whereby said check valve only permits one way flow through said supply passage.

21. The limited slip differential according to claim 18, further comprising means for reducing the loss of fluid from between said side gear and said pinion gear.

22. The limited slip differential according to claim 18, further comprising a bleed off passage through which fluid exits said cavity.

23. The limited slip differential according to claim 22, wherein said bleed off passage has an inlet connected to said cavity and an outlet disposed on a second surface of said side gear.

* * * * *

UNITED STATES PATENT AND TRADEMARK OFFICE
CERTIFICATE OF CORRECTION

| | |
|---|---|
| PATENT NO. | : 6,001,040 |
| DATED | : January 4, 2000 |
| INVENTOR(S) | : James L. Engle |

It is certified that error appears in the above-identified patent and that said Letters Patent is hereby corrected as shown below:

<u>Column 11, claim 14,</u>
Line 9, change "rotatable" to -- rotatably --.
Line 13, change "rotatable" to -- rotatably --.

Signed and Sealed this

Thirteenth Day of November, 2001

Attest:

*Nicholas P. Godici*

NICHOLAS P. GODICI
*Attesting Officer*    *Acting Director of the United States Patent and Trademark Office*